(12) United States Patent
Reimann et al.

(10) Patent No.: US 11,704,343 B2
(45) Date of Patent: Jul. 18, 2023

(54) METHOD AND SYSTEM FOR ADVANCED ADAPTIVE DATABASE MATCHING

(71) Applicants: HEXAGON TECHNOLOGY CENTER GMBH, Heerbrugg (CH); HEXAGON CAPABILITY CENTER INDIA PRIVATE LIMITED, Telangana (IN)

(72) Inventors: Bernd Reimann, Heerbrugg (CH); Alexandre Heili, Altstätten (CH); Nicholas Bade, Widnau (CH); Akshit Budhraja, Altstätten (CH); Krishan Kumar Meghani, Hyderabad (IN); Jyotirmoy Verma, Hyderabad (IN); Kumara Chandra Singarapu, Hyderabad (IN)

(73) Assignees: HEXAGON TECHNOLOGY CENTER GMBH, Heerbrugg (CH); HEXAGON CAPABILITY CENTER INDIA PRIVATE LIMITED, Hyderabad (IN)

( * ) Notice: Subject to any disclaimer, the term of this patent is extended or adjusted under 35 U.S.C. 154(b) by 0 days.

(21) Appl. No.: 17/324,755

(22) Filed: May 19, 2021

(65) Prior Publication Data
US 2021/0365479 A1 Nov. 25, 2021

(30) Foreign Application Priority Data
May 19, 2020 (IN) .............................. 202011021043

(51) Int. Cl.
*G06F 16/245* (2019.01)
*G06F 16/28* (2019.01)
(Continued)

(52) U.S. Cl.
CPC .......... *G06F 16/285* (2019.01); *G06F 16/245* (2019.01); *G06F 16/248* (2019.01); *G06N 20/00* (2019.01)

(58) Field of Classification Search
CPC .... G06F 16/285; G06F 16/245; G06F 16/248; G06F 16/25; G06F 16/284; G06N 20/00;
(Continued)

(56) References Cited

U.S. PATENT DOCUMENTS

| 9,535,902 | B1 * | 1/2017 | Michalak | G06F 16/3331 |
| 2004/0088117 | A1 * | 5/2004 | Dorsett, Jr. | G16C 20/10 |
| | | | | 702/22 |

(Continued)

*Primary Examiner* — Hicham Skhoun
(74) *Attorney, Agent, or Firm* — Maschoff Brennan

(57) ABSTRACT

A method of associating data from a plurality of databases is disclosed. The method comprises accessing a first database comprising a first dataset and a second database comprising a second dataset. The method further comprises identifying a first set of expressions and a second set of expressions corresponding to the first dataset and the second dataset, respectively. The method further comprises determining a first set of clusters and a second set of clusters corresponding to the first database and the second database, respectively. Furthermore, the method comprises creating a relational database based on a set of relationships and a mapping function determined based on the first set of clusters and the second set of clusters.

21 Claims, 11 Drawing Sheets

(51) Int. Cl.
*G06F 16/248* (2019.01)
*G06N 20/00* (2019.01)

(58) Field of Classification Search
CPC .... G06N 3/0445; G06N 3/0454; G06N 3/088;
G06N 5/022; G06N 7/005
USPC ........................................................ 707/737
See application file for complete search history.

(56) References Cited

U.S. PATENT DOCUMENTS

| | | | |
|---|---|---|---|
| 2011/0282631 A1* | 11/2011 | Poling | G06Q 10/10 |
| | | | 702/188 |
| 2013/0124545 A1* | 5/2013 | Holmberg | G06F 16/50 |
| | | | 707/769 |
| 2015/0254330 A1* | 9/2015 | Chan | G06F 11/3006 |
| | | | 707/613 |
| 2018/0052884 A1* | 2/2018 | Kale | G06F 16/242 |
| 2018/0075104 A1* | 3/2018 | Oberbreckling | G06F 16/2456 |
| 2018/0075115 A1* | 3/2018 | Murray | G06F 16/248 |
| 2018/0137424 A1* | 5/2018 | Gabaldon Royval | G06N 5/022 |
| 2018/0336019 A1* | 11/2018 | Schmidt | G06F 16/29 |
| 2019/0310991 A1* | 10/2019 | Burton | G06F 16/2358 |
| 2019/0354544 A1* | 11/2019 | Hertz | G06K 9/6259 |
| 2021/0157312 A1* | 5/2021 | Celia | G06V 10/82 |
| 2021/0201169 A1* | 7/2021 | Fung Moo | G06F 16/258 |
| 2021/0216881 A1* | 7/2021 | McCarthy | G06N 5/02 |
| 2021/0342541 A1* | 11/2021 | Taylor | G06N 5/022 |

\* cited by examiner

METHOD AND SYSTEM FOR ADVANCED ADAPTIVE DATABASE MATCHING

CROSS-REFERENCE TO RELATED APPLICATIONS

This application claims priority to Indian Patent Application No. 202011021043, filed on May 19, 2020. The foregoing patent application is herein incorporated by reference.

FIELD OF THE INVENTION

The present disclosure, in general, relates to database management and in particular relates to adaptive database matching.

BACKGROUND

To describe the same entities in a given domain and across a given workflow, different textual descriptions can be used depending upon the standards and taxonomies defined or adopted by different stakeholders. For instance, in a given work project arising in asset life cycle management of large industrial facilities, stakeholders representing different companies or groups acting in different roles such as contractor, supplier, operator, engineer, etc., may use different nomenclatures for defining the same object. As an example, in a given database relating to construction site management, the tool to list industrial objects may catalog the data using unique IDs—also known as commodity codes. In a more particular example, in plant process industries, for engineering, procurement and construction perspectives, the design tools leverage the catalog and specification as per design standards where the components are identified uniquely by such codes. These commodity codes are composed by following a set of pre-defined rules and standards which uniquely describe a data point. However, a user can choose to bring in custom sets of rules, grammar, taxonomies and standards to describe the same objects. Furthermore, in certain cases, a structured description of the components may be used. But the assumption that these commodity codes always follow a set of rules may not hold true for other systems and, for example, unstructured descriptions may also be used in certain cases.

When databases of such code listed descriptions are large, matching of the code list descriptions can be a cumbersome task and the identification and tracing of components or parts across databases becomes a complex, skill based and time-consuming process. To add to the complexity, the design attributes that constitutes the definition of any component may also vary in terms of order and numbers of attributes defining the component. Furthermore, there is no standard convention for abbreviations and acronyms, making the problem too complex to be solved with a simple table/dictionary/lookup table.

Thus, there is a need for a solution that overcomes at least one of the above deficiencies.

BRIEF SUMMARY OF THE INVENTION

This summary is provided to introduce a selection of concepts, in a simplified format, that are further described in the detailed description of the invention. This summary is neither intended to identify key or essential inventive concepts of the invention and nor is it intended for determining the scope of the invention.

In an example embodiment, a method of associating data from a plurality of databases is disclosed. The method comprises accessing a first database and a second database, where the first database comprises a first dataset of object descriptions associated with a plurality of objects as per a first schema, and where the second database comprises a second dataset of object descriptions associated with the plurality of objects as per a second schema. The method further comprises identifying a first set of expressions and a second set of expressions corresponding to the first dataset and the second dataset, respectively, where each expression of the first set of expressions and the second set of expressions comprises of at least one entry encoded using alphanumerical characters and defines an attribute of an object from the plurality of objects. The method further comprises determining a first set of clusters and a second set of clusters corresponding to the first database and the second database, respectively, based on at least one of domain data associated with the plurality of objects, an object category associated with the plurality of objects, a set of domain rules, the first set of expressions, and the second set of expressions, where each cluster in the first set of clusters comprises a corresponding first set of contextually similar objects from the plurality of objects and each cluster in the second set of clusters comprises a corresponding second set of contextually similar objects from the plurality of objects. The method further comprises deriving a mapping function between the first set of clusters and the second set of clusters of the first database and the second database, respectively. Furthermore, the method comprises creating a relational database making use of a mapping function. Here, the relational database comprises a mapping between at least one of the first set of clusters and the second set of clusters, the first set of expressions and the second set of expressions, the first set of contextually similar objects and the second set of contextually similar objects, and the first schema and the second schema.

In another example embodiment, an adaptive database matching (ADM) system for associating data from a plurality of databases is disclosed. The ADM system comprises a processor, an identification engine, a clustering engine, a matching engine, and a database manager. In an example, the identification engine is coupled to the processor and configured to access a first database and a second database, wherein the first database comprises a first dataset of object descriptions associated with a plurality of objects as per a first schema, and wherein the second database comprises a second dataset of object descriptions associated with the plurality of objects as per a second schema. Furthermore, the identification engine is configured to identify a first set of expressions and a second set of expressions corresponding to the first dataset and the second dataset, respectively, wherein each expression of the first set of expressions and the second set of expressions comprises of at least one entry encoded using alphanumerical characters and defines an attribute of an object from the plurality of objects. Furthermore, the clustering engine is coupled to the processor and configured to determine a first set of clusters and a second set of clusters corresponding to the first database and the second database, respectively, based on at least one of domain data associated with the plurality of objects, an object category associated with the plurality of objects, a set of domain rules, the first set of expressions, and the second set of expressions, wherein each cluster in the first set of clusters comprises a corresponding first set of contextually similar objects from the plurality of objects and each cluster in the second set of clusters comprises a corresponding second set of contextually similar objects from the plurality of objects. The matching engine is coupled to the processor and configured to derive a mapping function between the first set of clusters and the second set of clusters of the first database and the second database, respectively. Furthermore, the database manager is coupled to the processor and configured to create a relational database based on the mapping function determined by the matching engine, wherein the relational database comprises a mapping between at least one of the first set of clusters and the second set of clusters, the first set of expressions and the second set of expressions, the first set of contextually similar objects and the second set of contextually similar objects, and the first schema and the second schema.

In another example embodiment, a non-transitory medium is disclosed. The non-transitory medium comprises computer-executable instructions which, when executed by a processor, cause the processor to access a first database and a second database, wherein the first database comprises a first dataset of object descriptions associated with a plurality of objects as per a first schema, and wherein the second database comprises a second dataset of object descriptions associated with the plurality of objects as per a second schema. The instructions further cause the processor to identify a first set of expressions and a second set of expressions corresponding to the first dataset and the second dataset, respectively, wherein each expression of the first set of expressions and the second set of expressions comprises of at least one entry encoded using alphanumerical characters and defines an attribute of an object from the plurality of objects. The instructions further cause the processor to determine a first set of clusters and a second set of clusters corresponding to the first database and the second database, respectively, based on at least one of domain data associated with the plurality of objects, an object category associated with the plurality of objects, a set of domain rules, the first set of expressions, and the second set of expressions, wherein each cluster in the first set of clusters comprises a corresponding first set of contextually similar objects from the plurality of objects and each cluster in the second set of clusters comprises a corresponding second set of contextually similar objects from the plurality of objects. The instructions further cause the processor to derive a mapping function between the first set of clusters and the second set of clusters of the first database and the second database, respectively. The instructions further cause the processor to create a relational database based on the mapping function, wherein the relational database comprises a mapping between at least one of the first set of clusters and the second set of clusters, the first set of expressions and the second set of expressions, the first set of contextually similar objects and the second set of contextually similar objects, and the first schema and the second schema.

To further clarify advantages and features of the present invention, a more particular description of the invention will be rendered by reference to specific embodiments thereof, which is illustrated in the appended drawings. It is appreciated that these drawings depict only typical embodiments of the invention and are therefore not to be considered limiting of its scope. The invention will be described and explained with additional specificity and detail with the accompanying drawings.

BRIEF SUMMARY OF THE DRAWINGS

These and other features, aspects, and advantages of the present invention will become better understood when the following detailed description is read with reference to the accompanying drawings in which like characters represent like parts throughout the drawings, wherein.

Figure 1:
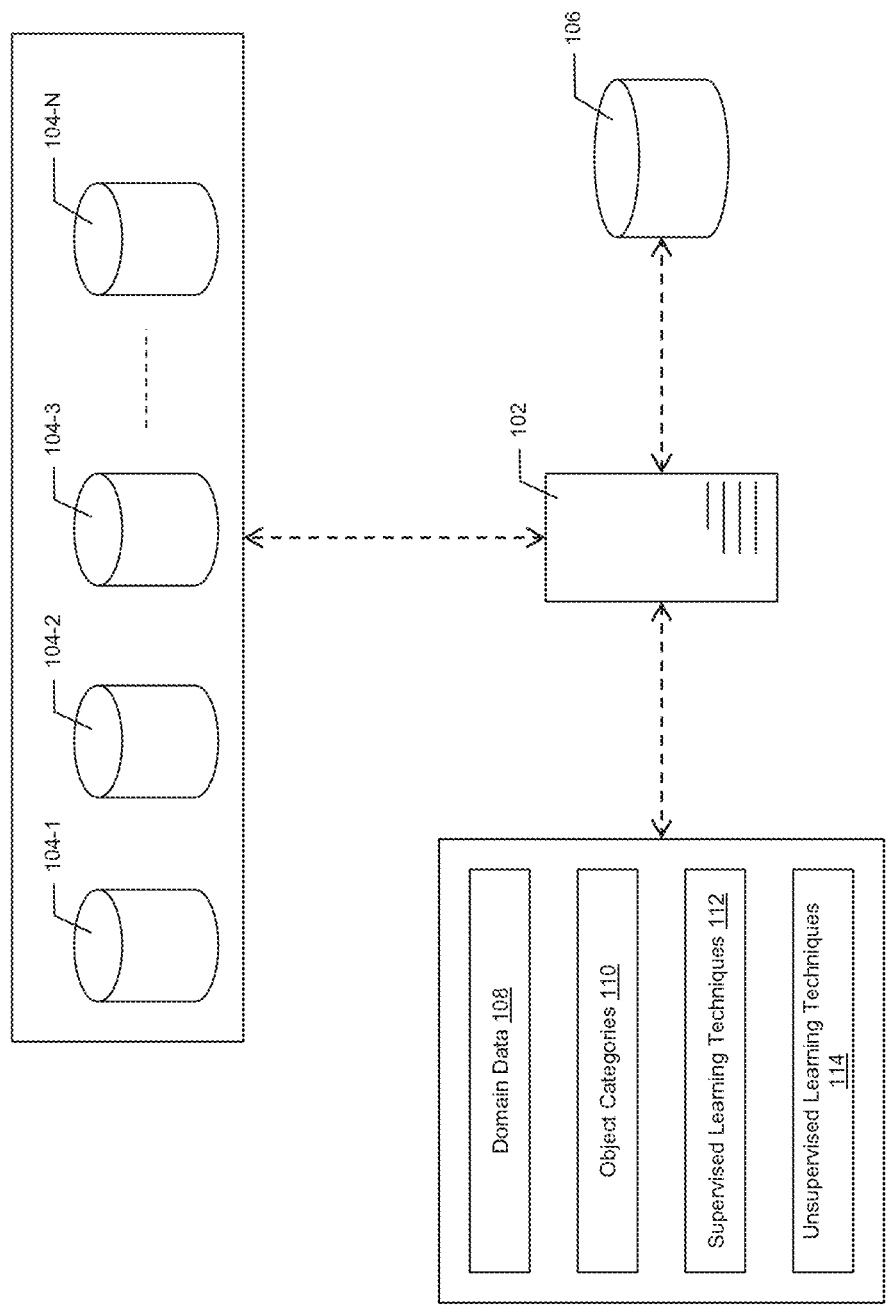
FIG. 1 illustrates a network environment implementing an Adaptive Database Matching (ADM) system for associating data from a plurality of databases, according to one or more embodiments of the present subject matter.

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the present invention. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

DETAILED DESCRIPTION

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are explanatory of the invention and are not intended to be restrictive thereof.

Reference throughout this specification to "an aspect", "another aspect" or similar language means that a particular feature, structure, or characteristic described in connection with the embodiment is included in at least one embodiment of the present invention. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skilled in the art to which this invention belongs. The system, methods, and examples provided herein are illustrative only and not intended to be limiting.

Embodiments of the present invention will be described below in detail with reference to the accompanying drawings.

FIG. 1 illustrates a network environment 100 implementing an Adaptive Database Matching (ADM) system 102 for associating data from a plurality of databases, according to one or more embodiments of the present subject matter. In an example, the network environment 100 comprises the ADM system 102 and a plurality of databases 104-1, 104-2, 104-3, . . . , and 104-N. The plurality of databases 104-1, 104-2, 104-3, . . . , and 104-N, hereinafter, may collectively be referred to as the databases 104 or individually be referred to as the database 104.

In an example, each of the databases 104 may include at least partially, a plurality of objects and associated object descriptions, interchangeably referred to as "codelist descriptions". In an example, one or more of the databases 104 may have unique object descriptions defined therein. In other words, an object A that is defined as per a first syntax in a first database 104-1 may be defined as per a second syntax in a second database 104-2. By way of example, the words and the terminologies used herein have been described below using the domain of construction industry with typical components and workflows associated therewith.

In an example, the term "object" as used herein may be understood as a digital representation of a corresponding physical world item, such as a specific pipe, a specific valve, a specific gasket, or other assets at industrial or construction facilities. In an example, the term "description" as used herein may be understood as a collection of expressions referring to attributes of the object. These expressions arise in the form of word tokens that consist of one or more of texts, numerals, alphanumerical characters and special characters, that are stringed together. As an example, Table 1 below illustrates objects, attributes, expressions and word tokens:

TABLE 1

| Object | Attribute | Expression | Word Tokens |
|---|---|---|---|
| Flanges | Piping Commodity Type | Socket welded flange | "Socket", "welded", "flange" |
| | Geometric Industry Standard | ASME B16.5 | "ASME", "B16.5" |
| | Pressure Rating | Class 300 | "Class", "300" |
| Valves | Piping Commodity Type | Gate Valve | "Gate", "Valve" |
| | Materials Industry | ASTM A182 | "ASTM", "A182" |

TABLE 1-continued

| Object | Attribute | Expression | Word Tokens |
|---|---|---|---|
| | Standard Pressure Rating | Class 800 | "Class", "800" |

The terms used in this present description are defined hereinunder, in a non-limiting manner:
Attribute: Property of an object.
Expression: Textual and/or numerical representation of an attribute value, e.g. "socket welded flange".
Word Token or Token: Individual words in an expression that represents an attribute value, e.g. "socket", "welded", "flange".
Furthermore, other words and terminologies used herein include:
Schema: Syntax standardising the attributes of object categories.
Object Category (also referred to as Commodity Group or Commodity Type): A high-level hierarchical categorization of objects, e.g. pipes, valves, gaskets, bolts, flanges, etc.
Cluster: Groups of objects that are close to each other either semantically (unsupervised clustering) or by object category (supervised clustering).
Object Description or Codelist Description: Union of expressions that captures all attribute values that describe a particular object, e.g. "Socket Welded Flange, ASME B16.5, Class 300".
Commodity Code: Unique ID generated based on the codelist description.

According to an aspect of the present subject matter, the ADM system 102 may be configured to create a relational database 106 based on one or more of the databases 104. To that end, in an example, the ADM system 102 may implement or make use of one or more of domain data 108, object categories 110, supervised learning techniques 112, and unsupervised learning techniques 114. The domain data 108 may be understood as data including taxonomies, standards, specifications, pre-stored annotations, and the like pertaining to a given domain in which the ADM system 102 may be implemented. The created relational database 106 facilitates in providing comprehensive results to input queries by overcoming the challenge of identifying uniquely described object descriptions in different databases. In an example, the ADM system 102 may be implemented in one or more computing devices, such as, for example, a database server, a cloud server, a workstation server, a workstation computer, a laptop, and the like.

In an example embodiment, the ADM system 102 may be configured to access a first database 104-1 and a second database 104-2. In an example, the first database 104-1 may include a first dataset of object descriptions associated with a plurality of objects as per a first schema. In an example, the second database 104-2 may include a second dataset of object descriptions associated with the plurality of objects as per a second schema.

Subsequent to the accessing of the databases 104-1 and 104-2, the ADM system 102 may be configured to identify a first set of expressions and a second set of expressions corresponding to the first dataset 104-1 and the second dataset 104-2, respectively. Herein each expression of the first set of expressions and the second set of expressions comprises of at least one entry encoded using alphanumerical characters. Furthermore, as explained above, each expression arising from individual word tokens defines an attribute of an object from the plurality of objects.

Once the first set of expressions and the second set of expressions are identified, the ADM system 102 may be configured to determine a first set of clusters and a second set of clusters corresponding to the first database 104-1 and the second database 104-2, respectively. In an example, each cluster in the first set of clusters comprises a corresponding first set of contextually similar objects from the plurality of objects. Similarly, in an example, each cluster in the second set of clusters comprises a corresponding second set of contextually similar objects from the plurality of objects. In an example embodiment, the ADM system 102 may be configured to determine the first set of clusters and the second set of clusters based on at least one of domain data associated with the plurality of objects, an object category associated with the plurality of objects, a set of domain rules, the first set of expressions, and the second set of expressions.

After determining the first set of clusters and the second set of clusters, the ADM system 102 may be configured to create the relational database 106 based on a set of relationships and a mapping function. Herein the relationships and the mapping function may be determined based on the first set of clusters and the second set of clusters. In an example, the relational database 106 comprises a mapping between the elements of the first database 104-1 and the second database 104-2 at various levels. For instance, the mapping may be between one or more of the first set of clusters and the second set of clusters, the first set of expressions and the second set of expressions, the first set of contextually similar objects and the second set of contextually similar objects, and the first schema and the second schema.

The relational database 106 thus created, facilitates in optimizing the results to input queries received by the ADM system 102. As the uniquely defined object descriptions in different databases 104 are mapped at various levels, while resolving the input query, the ADM system 102 is able to identify correlated objects. This greatly assists in providing a comprehensive and adaptive solution to managing and integrating data from different databases of a workflow that have uniquely described object descriptions.

As an example, in a given use case where we can get two varied descriptions for the same component or commodity from two different systems or repositories, the system 102 establishes a one-to-one correspondence between the two descriptions indicating that they are referring to the same object. Provided below are two codelist descriptions for the same object enlisted in different databases or repositories, for example, Repository-1 and Repository-2.

Repository-1=90 deg LR elbow, [403], BE, ASTM-A234-WPB, ASME-B16.9

Repository-2=90 Degree Elbow Long Radius (R=1.5D), ASME B16.9, Steel Beveled End Fittings, Beveled End, ASTM A234 Grade WPB In such cases, by implementing the aspects described herein, the system 102 helps in identifying that the following exemplary word tokens correspond to each other:

| Repository-1 | Repository-2 |
|---|---|
| 90 deg LR elbow | 90 Degree Elbow Long Radius (R = 1.5 D) |
| [403] | <Runtime replacement in design system> |
| BE | Steel Beveled End Fittings/Beveled End |
| ASTM-A234-WPB | ASTM A234 Grade WPB |
| ASME-B16.9 | ASME B16.9 |

Accordingly, the system 102 links them up in a relational database, such as the relational database 106, along with other such instances of matching and mapping. This provides for the aforementioned advantages.

Figure 2:
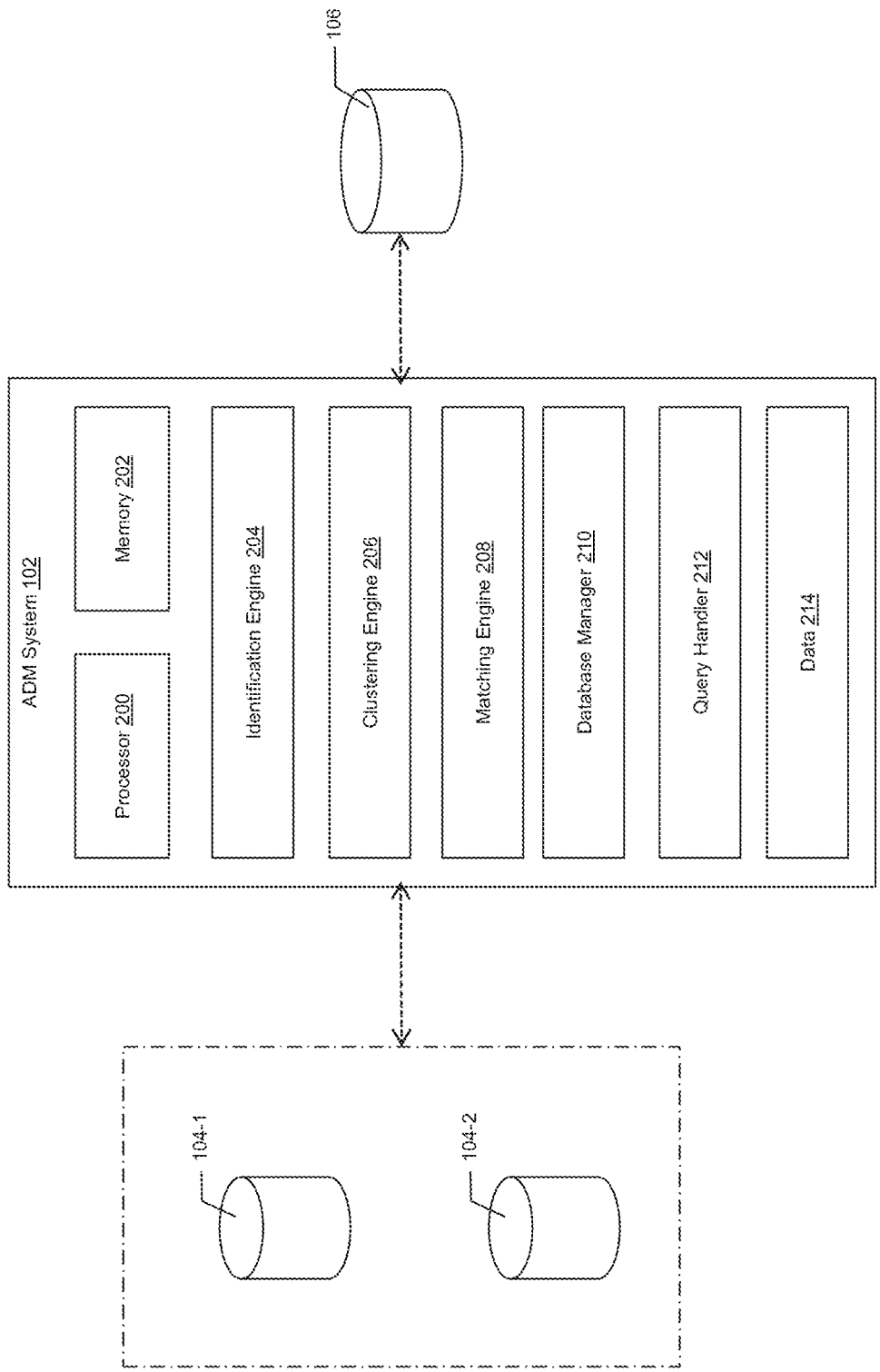
FIG. 2 illustrates a schematic block diagram of the ADM system, according to one or more embodiments of the present subject matter.

FIG. 2 illustrates a schematic block diagram of the ADM system 102, according to one or more embodiments of the present subject matter. In an example, the ADM system 102 includes a processor 200, memory 202, an identification engine 204, a clustering engine 206, a matching engine 208, a database manager 210, a query handler 212, and data 214. In an example, the memory 202, the identification engine 204, the clustering engine 206, the matching engine 208, the database manager 210, and the query handler 212 are coupled to the processor 200.

In an example, the processor 200 may be a single processing unit or a number of units, all of which could include multiple computing units. The processor 200 may be implemented as one or more microprocessors, microcomputers, microcontrollers, digital signal processors, central processing units, state machines, logic circuitries, and/or any devices that manipulate signals based on operational instructions. Among other capabilities, the processor 200 is configured to fetch and execute computer-readable instructions and data stored in the memory 202.

The memory 202 may include any non-transitory computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes.

The identification engine 204, the clustering engine 206, the matching engine 208, the database manager 210, and the query handler 212, amongst other things, include routines, programs, objects, components, data structures, etc., which perform particular tasks or implement data types. The identification engine 204, the clustering engine 206, the matching engine 208, the database manager 210, and the query handler 212 may also be implemented as signal processor(s), state machine(s), logic circuitries, and/or any other device or component that manipulate signals based on operational instructions. Furthermore, the identification engine 204, the clustering engine 206, the matching engine 208, the database manager 210, and the query handler 212 may be implemented in hardware, instructions executed by a processing unit, or by a combination thereof. The processing unit can comprise a computer, a processor, such as the processor 200, a state machine, a logic array or any other suitable devices capable of processing instructions. The processing unit can be a general-purpose processor that executes instructions to cause the general-purpose processor to perform the required tasks or, the processing unit can be dedicated to perform the required functions.

In another aspect of the present subject matter, the identification engine 204, the clustering engine 206, the matching engine 208, the database manager 210, and the query handler 212 may be machine-readable instructions (software) which, when executed by a processor/processing unit, perform any of the described functionalities. The data 214 serves, amongst other things, as a repository for storing data processed, received, and generated by one or more of the processor 200, the identification engine 204, the clustering engine 206, the matching engine 208, the database manager 210, and the query handler 212.

As mentioned above, the ADM system 102 may be configured to create the relational database 106 based on at least two databases 104. As an example, as showed herein in this figure, the ADM system 102 may be configured to create the relational database 106 based on the first database 104-1 and the second database 104-2.

To that end, in an example embodiment, the identification engine 204 may be configured to access the first database 104-1 and the second database 104-2. Upon accessing the first database 104-1 and the second database 104-2, in an example embodiment, the identification engine 204 may be configured to perform pre-processing and adding meta-information on the description of entities in the respective databases based on one or more language processing techniques and domain data 108, e.g. by applying tokenization, stemming and lemmatization. As a result, the data included in said databases 104 may be normalized without impacting the context. By way of example, the pre-processing may include modifying a case of the input strings to one of a lower case or an upper case. By way of another example, the pre-processing may include stemming to reduce the inflection of the words. For instance, "flange", "flanged", "flanges" would all be stemmed to the root word "flange". By way of another example, the pre-processing may include removal of stop-words. As an example, in specific domains a removal of stop-words such as "and" or "with" from the corpus does not change the meaning of the expressions under consideration. By way of another example, noise or punctuation removal may be done so that the characters which interfere with the analysis can be removed. By way of another example, text formatting for having consistent delimiters for the words within a given corpus may be done. Herein, multiple spaces shall be purged to single space and each word shall have the padding of one and only one space. By way of further example, domain related formatting/filtering shall be applied. As an example, in the piping domain perspective, if a word starting with numeric character is following any other word, then both these words can be concatenated without changing the meaning of the context. For example, "CL 500" would then be transformed into "CL500". Thus, the pre-processing of data facilitates in normalization of the data, i.e. in the mapping of non-canonical language to standardized writing, and aids in achieving greater accuracy.

Subsequently, the identification engine 204 may be configured to identify a first set of expressions and a second set of expressions corresponding to the first dataset and the second dataset, respectively. For identifying a set of expressions, in an example, the identification module 204 may be configured to take raw text from the databases 104 and identify expressions within this list of words. More specifically, in an example, the identification engine 204 may take as input a stream of words as one large string, without any differentiation between the different databases 104. As an example, the identification engine 204 may take the following string from the databases 104:

String: "SO Flg.—Hub Type, RPS Composites FRP Flanges per ASTM D4024, P Series, Belled Adhesive Joint, CL150, FFFE, ASTM D5685, Grade 4 (Vinylester resin), Standard Specification for "Fiberglass" (Glass-Fiber-Reinforced Thermosetting-Resin) Pressure Pipe Fittings"

The identification engine 204 processes the input string and provides an output comprising a plurality of sub-strings, where each sub-string corresponds to an expression. As an example, based on the above example string, the identification module 204 may provide the following sub-strings:

Sub-Strings:
a) SO Flg.—Slip-on Flange
b) FFFE—Flat-face flanged end
c) CL150—Class150
d) Belled Adhesive Joint
e) Pressure Pipe Fittings
f) All other words In an example embodiment, for identifying the set of expressions, the identification engine 204 may be configured to implement one or more of the following techniques: statistical analysis of co-occurrences, rule-based segmentation, reinforcement learning algorithms using human feedback, and supervised machine learning algorithms using databases with annotations obtained from human engineers.

In an example where the identification engine 204 implements the statistical analysis of co-occurrences technique, the identification engine 204 may be configured to automatically find groups of words that frequently co-occur consecutively or interchangeably. For example, the word "Nibco" is often followed by "valve". If in any document, the words "Nibco" and "valve" are following each other, they will be merged into a single expression. Similarly, there are several components, definitions or expressions for which there are words which occur together. For example, "weld neck flange", or "blond flange", or "gate valve", "globe valve", "lap joint", or "stub end", etc. Contrary to the above-mentioned examples, there are words which can interchangeably occur with any other words. For example, we can have "reducing branch" or "reducing tee", or "eccentric or concentric—reducer or expander", etc.

In an example where the identification engine 204 implements the rule-based segmentation technique, the identification engine 204 may be configured to group words into expressions based on "if, then" conditions. For example, if a word is composed of a few capital letters and is not in the dictionary, it is probably an acronym and as such constitutes an expression by itself, unless it is followed by a number, etc.

An example of an output generated by the identification engine is provided herein. Consider an example where the commodity description for a flange is provided as "WN Flg., AMSE B16.47, Sr A, CL 150, RFFE, ASTM A105". Here we can get the tokens as "WN Flg", "ASME B16.47", "Sr A" "CL 150", "RFFE", "ASTM A105". For the same component, if the definition is provided in more descriptive manner like "Weldneck Flange, ASME B16.47, Series A, Large Diameter Steel Flanges, Class 150, Raised Face Flanged End, ASTM A105" then we would get tokens as "Weldneck Flange", "ASME B16.47", "Series A", "Large Diameter Steel Flanges", "Class 150", "Raised Face Flanged End", "ASTM A105".

Figure 8:
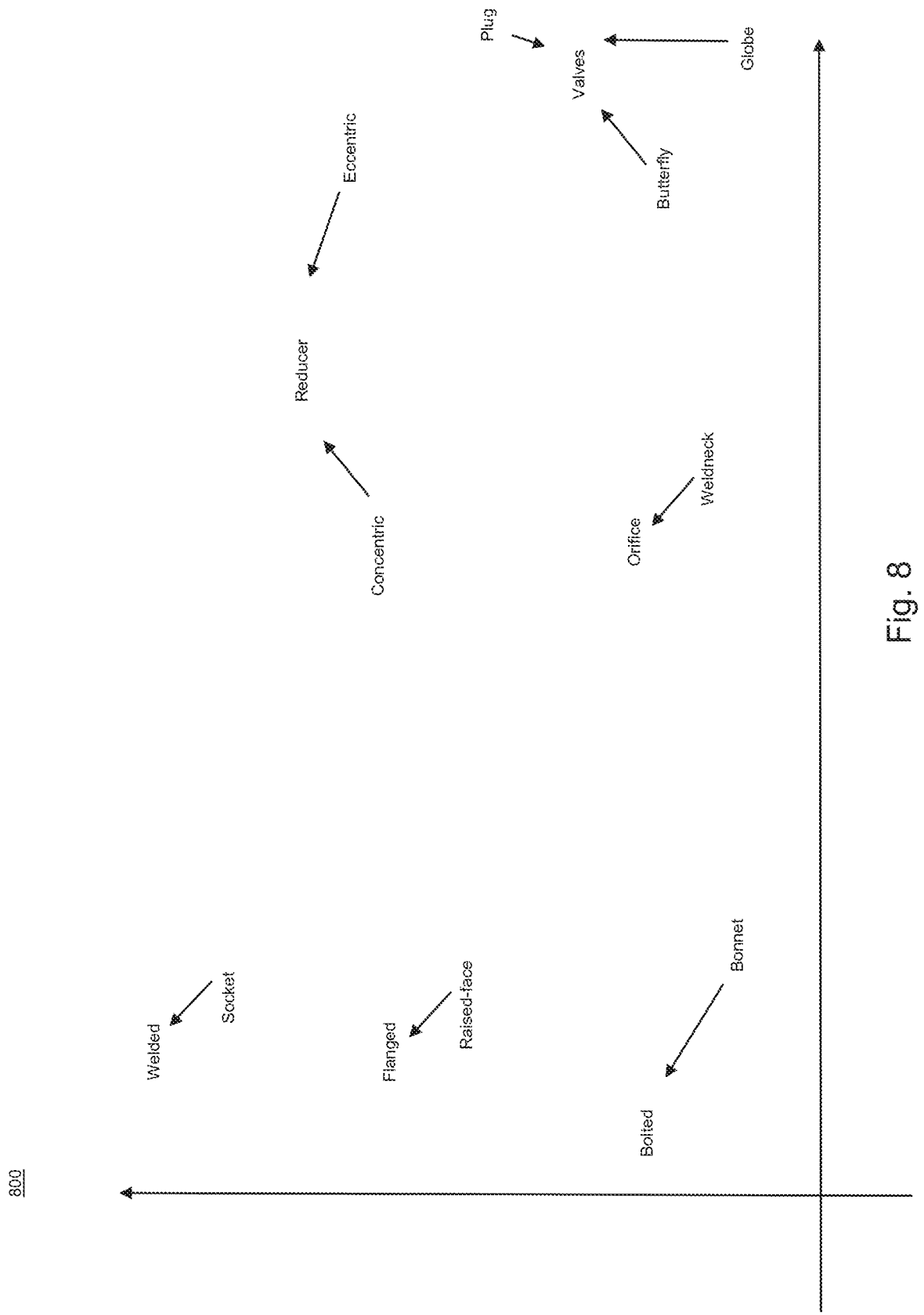
FIG. 8 illustrates an example vector space of an exemplary use case, where an unsupervised language model groups contextually similar word tokens together into expressions, according to an embodiment of the present subject matter.

In an example where the identification engine 204 implements the unsupervised language model, the identification engine 204 may be configured to exploit the learned grammar and underlying statistical model to group consecutive words into expressions as illustrated in FIG. 8.

In an example where the identification engine 204 implements a reinforcement learning technique, based on historical data, the identification engine 204 may be configured to group consecutive words into "proposed" expressions and be rewarded or penalized by a human or software agent to improve over time, until the system can identify expressions with an appropriate accuracy.

Thus, the identification engine 204 identifies the first set of expressions and the second set of expressions corresponding to the first dataset and the second dataset, respectively, as explained above.

In an example embodiment, the clustering engine 206 may be configured to determine a first set of clusters corresponding to the first database 104-1 and a second set of clusters corresponding to the second database 104-2. In an example, each cluster in the set of clusters comprises a corresponding set of contextually similar objects from the plurality of objects. As an example, for a given database comprising data of construction site objects, each cluster of the set of clusters may include similar objects. For example, a first cluster may include a set of pipes, a second cluster may include a set of flanges, and so on and so forth. Thus, each cluster in the first set of clusters comprises a corresponding first set of contextually similar objects from the plurality of objects. Similarly, each cluster in the second set of clusters comprises a corresponding second set of contextually similar objects from the plurality of objects. In an example, the clustering engine 206 determines the first set of clusters and the second set of clusters based on at least one of domain data associated with the plurality of objects, an object category associated with the plurality of objects, a set of domain rules, the first set of expressions, and the second set of expressions.

In an example embodiment, the clustering engine 206 at first may be configured to identify the objects to which the expressions in the set of expressions, identified by the identification module 204, relate. Once the objects are identified, the clustering engine 206 then identifies the contextually similar objects and groups them into a single cluster. In an example embodiment, the clustering engine 206 identifies the corresponding set of contextually similar objects based on one of the domain data and contextual similarity. Herein, the contextual similarity is based at least on the domain data and the set of expressions identified for a given database. As an example, the first set of contextually similar objects comprised in a cluster of the first set of clusters associated with the first database 104-1 may be determined based on domain data or contextual similarity. Herein, the contextual similarity is based on the domain data and the first set of expressions.

By way of example, the clustering engine 206 may be configured to receive as input, a list of expressions and identify which set of expressions describe the same object category by clustering them based on domain data. Subsequently, the clustering engine 206 provides as output an assignment indicating which set of expressions belongs to the same object category. It assigns a similarity index to these expressions based on how contextually similar the entries within each set are.

In an example embodiment, the clustering engine 206 may be configured to implement one or more of the following techniques for performing the above mentioned operations: a) rule-based segmentation such as using domain data to cluster together expressions belonging to the same object category; b) supervised machine learning algorithms such as Siamese Networks which uses databases with annotations obtained from human engineers; and c) unsupervised machine learning techniques such as Latent Dirichlet Allocation (LDA) for topic modelling to cluster expressions based on the most likely topics it contains.

Writing further, after the classification of the expressions to corresponding parts, the clustering engine 206 may be configured to determine the set of clusters by performing at least one of a rule based technique and an Artificial Intelligence (AI) based technique. In an example embodiment, when performing the rule based technique to determine the set of clusters, the clustering engine 206 may be configured to analyse a schema associated with the database. Furthermore, the clustering engine 206 may be configured to extract the set of domain rules based on the analysing, i.e., based on the schema. Herein, the set of domain rules correspond to an order of object attributes for one or more object categories.

Subsequently, the clustering engine 206 may be configured to determine the first set of clusters and the second set of clusters based on the extracted set of domain rules.

In another example embodiment, when performing the AI based technique to determine the set of clusters, the clustering engine 206 may be configured to analyze the set of expressions and determine the set of clusters based on a semantic and contextual similarity between the expressions in the set of expressions. As explained above, once the list of expressions is obtained, one or more of the AI based techniques may be implemented by the clustering engine 206 to determine the set of clusters.

Figure 7:
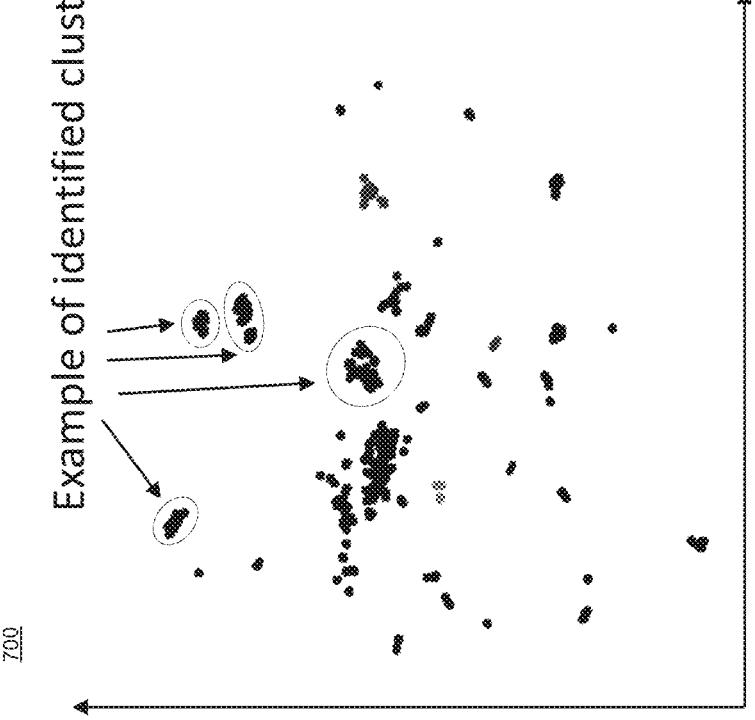
FIG. 7 illustrates a two-dimensional plot, illustrating a step of clustering, according to an embodiment of the present subject matter.

By way of example, the clustering module 206 takes the identified parts and clusters them into different groups with same technical or semantical meaning. For example, all valves could be clustered together or all parts with the same technical specifications could be clustered together. To that end, the clustering engine 206 receives the list of objects from one of the databases 104 as an input. As an output, the clustering engine 206 then provides a clustering of objects in an embedding space with a similarity measure as illustrated in FIG. 7.

For performing the aforementioned operations, in an example, the clustering engine 206 may implement one or more of the following techniques: unsupervised clustering analysis algorithms, such as hierarchical clustering, neural networks or other statistical approaches together with some dimensionality reduction techniques.

In an example embodiment, whenever the user selects one part, the clustering engine 206 may be configured to provide, for example, via a display, related parts based on learned similarity measure. This would allow the user to easily select several parts that belong together but are not necessarily presented in consecutive order in the database 104.

After the determining of the first set of clusters and the second set of clusters, in an example embodiment, the matching engine 208 is configured to derive a mapping function between the two set of clusters. In an example embodiment, the matching engine 208 may be configured to implement one or more of the following techniques for mapping the first database 104-1 to the second database 104-2 at various levels of data, i.e., schema, similar objects, expressions, clusters, etc.: an unsupervised learning technique, a supervised learning technique, a feedback loop/active learning technique, and a numerical statistic method.

For instance, the matching engine 208 may be configured to learn a probabilistic graphical model such as a Bayesian network that computes a joint probability distribution and infers closest match at different levels—the object categories, schema, expressions, and clusters. As an example:

a) If the expression contains the word token "socket", the trained graph model will output that the expression is describing a "flange" object with a high probability using the object category information.

b) If the expression contains the word "ASME", the trained graph model will output that the expression is describing the "geometric industry standard" attribute with a high probability using the schema information.

c) If the expression in the first set of expressions contains the word "CL300", the trained graph model will output that the corresponding expression in the second set of expressions would contain the word "Class 300" with a high probability.

d) If the expression contains the word "socket welded", the trained graph model will infer all the similar expressions which belong to the same cluster with a high probability using the clustering information.

In the end, the probabilistic graphical model captures the inter-dependency at different levels—object category, schema, expressions and clusters, which will be used as a mapping function to find similarity (based on probabilistic inference) between first set of expressions and the second set of expressions corresponding to the first database 104-1 and the second database 104-2, respectively.

In another example embodiment, as mentioned above, the matching engine 208 may be configured to implement a supervised learning model based on neural embeddings, where a deep neural network is trained to take as input an information vector that summarizes the object description from first database 104-1 at different levels—object category, schema, expressions, and cluster, and outputs a corresponding description from the second database 104-2 that closely resembles the input description.

In an example embodiment, for determining an expression in the second set of expressions that matches an expression of the first set of expressions, the matching engine 208 may be configured to cluster the expressions based on the word distribution and the domain data and/or domain rules derived from respective schema. Subsequently, the matching engine 208 may use the mapping function that maps the first database 104-1 to the second database 104-2. As explained above, the mapping function is determined based on the first set of clusters and the second set of clusters. In an example embodiment, the matching engine 208 may be configured to implement any one of the following techniques: Statistical analysis of co-occurrences, a supervised machine learning technique, an unsupervised learning technique, and reinforcement learning. Examples of the supervised learning technique include, but are not limited to, deep neural networks, Siamese-like networks, neural collaborative filtering. Examples of the unsupervised machine learning include, but not limited to, recurrent autoencoders, word embeddings, and topic modelling.

Once the mapping function is defined by the matching engine 208, the database manager 210 may be configured to create a relational database, such as the relational database 106, based on a set of relationships derived by the mapping function. In an example, the relational database comprises a mapping between at least one of the first set of clusters and the second set of clusters, the first set of expressions and the second set of expressions, the first set of contextually similar objects and the second set of contextually similar objects, and the first schema and the second schema. In other words, the mapping is in the form of a knowledge graph, where a relationship at each level exists between the first database 104-1 and the second database 104-2. These levels may be the first set of clusters and the second set of clusters, the first set of expressions and the second set of expressions, the first set of contextually similar objects and the second set of contextually similar objects, and the first schema and the second schema. The set of relationships and the mapping function may be determined based on the first set of clusters and the second set of clusters, in an example embodiment, as explained above.

In an example embodiment, the database manager 210 may store the mapping in the relational database 106 as a knowledge graph, for example, in the data 214. Herein, the knowledge graph defines the set of relationships between at least one of the first set of clusters and the second set of clusters, the first set of expressions and the second set of expressions, the first set of contextually similar objects and the second set of contextually similar objects and the first schema and the second schema.

In an example, the database manager 210 may be configured to update the knowledge graph. The updating of the knowledge graph may be facilitated either based on a user input or based on an update to the domain data or any existing relationship at any of the data levels. The user input may be provided by an individual, for example, a domain expert. In another example, the domain data may be updated for example based on updates of new parts. In another example, the update of any existing relationship may be caused by, for example, removal of the part or the object by the user.

In an example embodiment, the database manager 210 may be configured to provide the knowledge graph to a user, for example, using a display. In said example embodiment, the database manager 210 may then receive a user input, for example, using a user interface or as an audio and/or gesture command for updating at least one relationship from the set of relationships defined in the knowledge graph. Accordingly, the database manager 210 updates at least one relationship to generate an updated knowledge graph and stores the updated knowledge graph in a central storage. The central storage, in an example, may be accessible to a plurality of authenticated computing terminals.

In another example embodiment, the database manager 210 may be configured to obtain an update to at least one of the domain data and at least one relationship in the set of relationships. Accordingly, the database manager 210 updates at least one relationship to generate an updated knowledge graph and stores the updated knowledge graph in a central storage. The central storage, in an example, may be accessible to a plurality of authenticated computing terminals.

Thus, the relational database 106 created by the ADM system 102 provides for several advantages. As an example, the cumbersome task of manually identifying similar objects/components/commodities that have been classified differently in different databases is mitigated. Aspects of the present subject matter provide for identification and correlation of such objects/components/commodities across databases. This makes it easier for a user to search for an object that has been stored under different schemas in different databases. Furthermore, the user is provided with a more comprehensive query response, whenever a user aims to search for a product.

In an embodiment, the query handler 212 may be configured to receive a query associated with an object. More particularly, the query comprises at least one of an object from the plurality of objects and at least a part of an object description associated with the object. For instance, a user may simply put in the name of an object. In another example, the user may put in an expression associated with the object. On receiving the query, the query handler 212 may be configured to identify at least one of a cluster, an object, and an expression from the first set of clusters, the first set of contextually similar objects, and the first set of expressions, respectively, based on the query. Thereafter, the query handler 212 may be configured to identify at least one of a cluster, an object, and an expression from the second set of clusters, the second set of contextually similar objects, and the second set of expressions, respectively, based on the mapping defined in the relational database 106. Subsequently, the query handler 212 may be configured to provide at least one of the identified clusters, objects, and expressions as an output to the query. Furthermore, in an example embodiment, the database manager 210 may be configured to provide the degree of similarity that the two representations have in common. This is a very important aspect from the end user's perspective as they get the quantitative indication of how similar the two representations are to each other.

Figure 3:
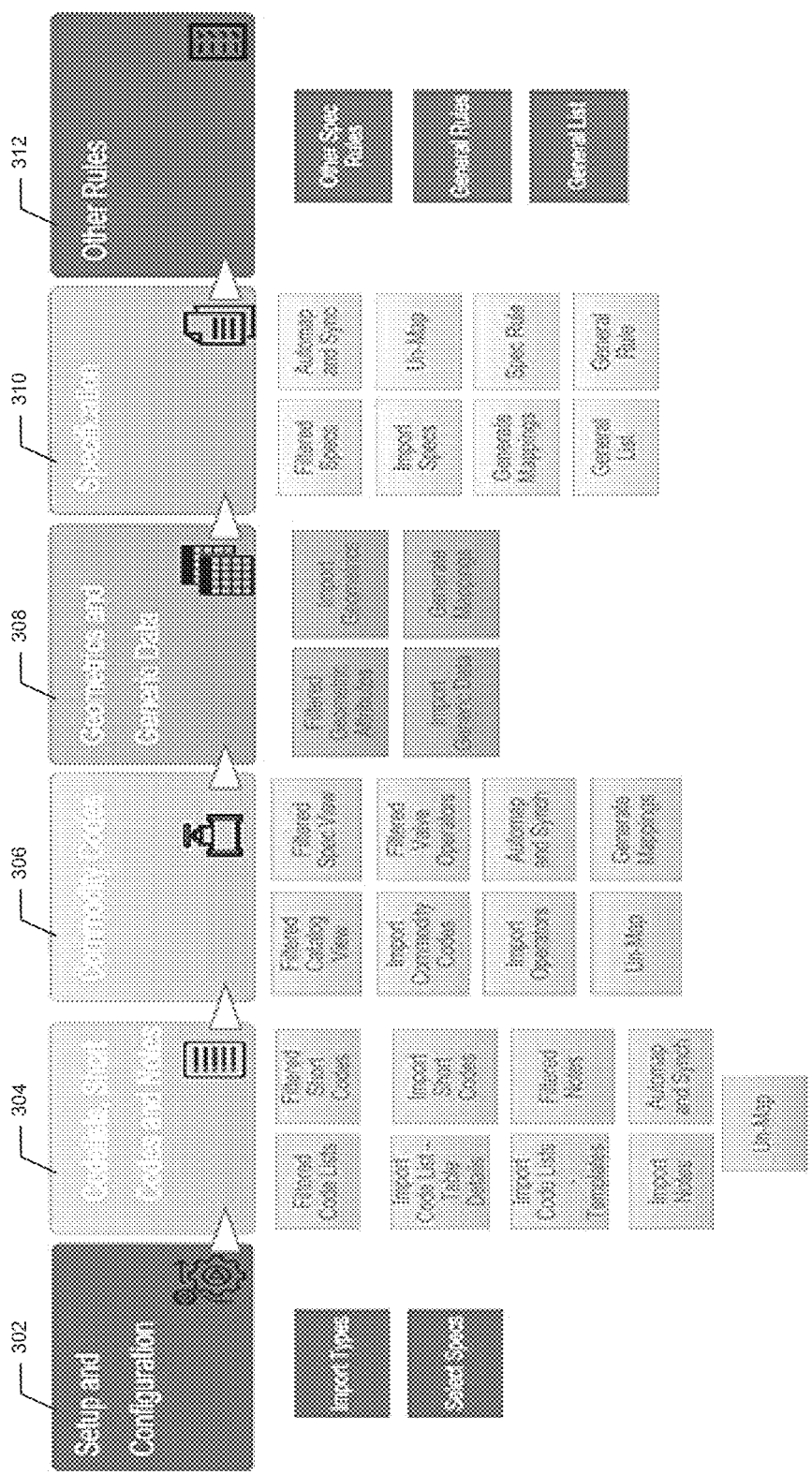
FIG. 3 represents an exemplary workflow, implemented by the system 102, according to an embodiment of the present subject matter.

FIG. 3 represents an exemplary workflow, implemented by the system 102, according to an embodiment of the present subject matter. In a non-limiting manner, the example workflow describes and illustrates the setup, configuration, usage of codelists, short codes and notes, commodity codes, geometrics and generic data, as well as specifications and other rules, that may be implemented by the system 102.

In an example embodiment, there are several steps that the system 102 needs to perform in order to consume and map data from various sources, such as pipe specs and other design and modelling systems. The system 102 would first need to create the setup and configure the logical data structures in order to enable it to bring data into a staging area where the system would refine and manipulate the data as per the host system's design. In a first step 302 the catalog structure is created based on the incoming design system. In an example, the user may also specify whether the commodities that are used, are following the company specific definition standard or design tool specific definition standard. The data can be filtered for the entire catalog or by a piping specification.

Going forward, at step 304, the system 102 is configured to import the codification or lookup values for the standards for the data. Such data constitutes the description of each commodity and also works as base reference to several design specific references. These data are referred to as code lists. They are codified as unique number for a property type and have corresponding detailed descriptions associated with it. For example, if we consider an end preparation of any piping component, the code list for "Flat-full-face thru-bolted end with threaded bolt holes" can be #271 whereas the code list for "Flat-full-face thru-bolted end with non-threaded bolt holes" can be #272. Other aspect of the design information that need to be imported is the broad grouping of component reference, which is called short codes, like, Valves, Flanges etc. for inline fittings or Pipes, Tubes, Hose for plain piping and tubing. Along with this data, the system 102 also needs to import the standard notes. There are specific notes that are indicated and referenced for designing and modelling of the system 102. These are called standard notes and are used at the piping specification level for details. These standard notes are also imported into the system 102 for further management of specification data. Examples of codified standard notes can be "Use for hydrostatic vents and drains. Seal (bridge) weld after testing in accordance with piping job specifications." as standard note 304. At each stage, the project or customer specific data that is brought into a catalog management system, implemented by or integrated with or in communication with, the system 102, shall be mapped with the existing standard data.

At step 306, the system 102 may be configured to import the piping commodities (703) and store it against the existing standard commodity definitions. For example "Paddle spacer, raised face thru-bolted ends, API-590 CL300, w/0.125" corrosion allowance, ASTM-A240 Type 304" can be stored against existing standard commodity definition as "Paddle Spacer, ASME B16.48, Steel Line Blanks, Class 300, Raised Face Through Bolted End, ASTM A240 (UNS S30400, AISI Grade 304)". Along with the commodity definition and descriptions, the system 102 may also import the operator details of the commodities like "Gear, side mounted handwheel Type 5 (mirror of Type 1)", "Lever, inclined, Type 1", etc. All the commodities also include their codified values as well.

At step 308, geometric data associated with the piping specification which is the rule for selecting piping parts during the design phase, is consumed. In an example, the geometric data indicates the sizes and wall thickness of the piping component being used in the piping specification. At step 310, as all the base data has been imported, the user may eventually import the piping specification data as well into the system 102. This would constitute the short code, options, and the size ranges for which the commodity or component shall be applied. Data also constitutes the details of the branch table and tap details. This data may include the data for service limits (P/T) data which indicates the pressure and temperature to which a component shall be designed to work. Below is an exemplified representation of a tap property. Finally, at step 312, the other supporting rules for specification which augment the design and modelling process would be imported. Subsequently, the system 102 operates as described above for creating a relational database.

Figure 4:
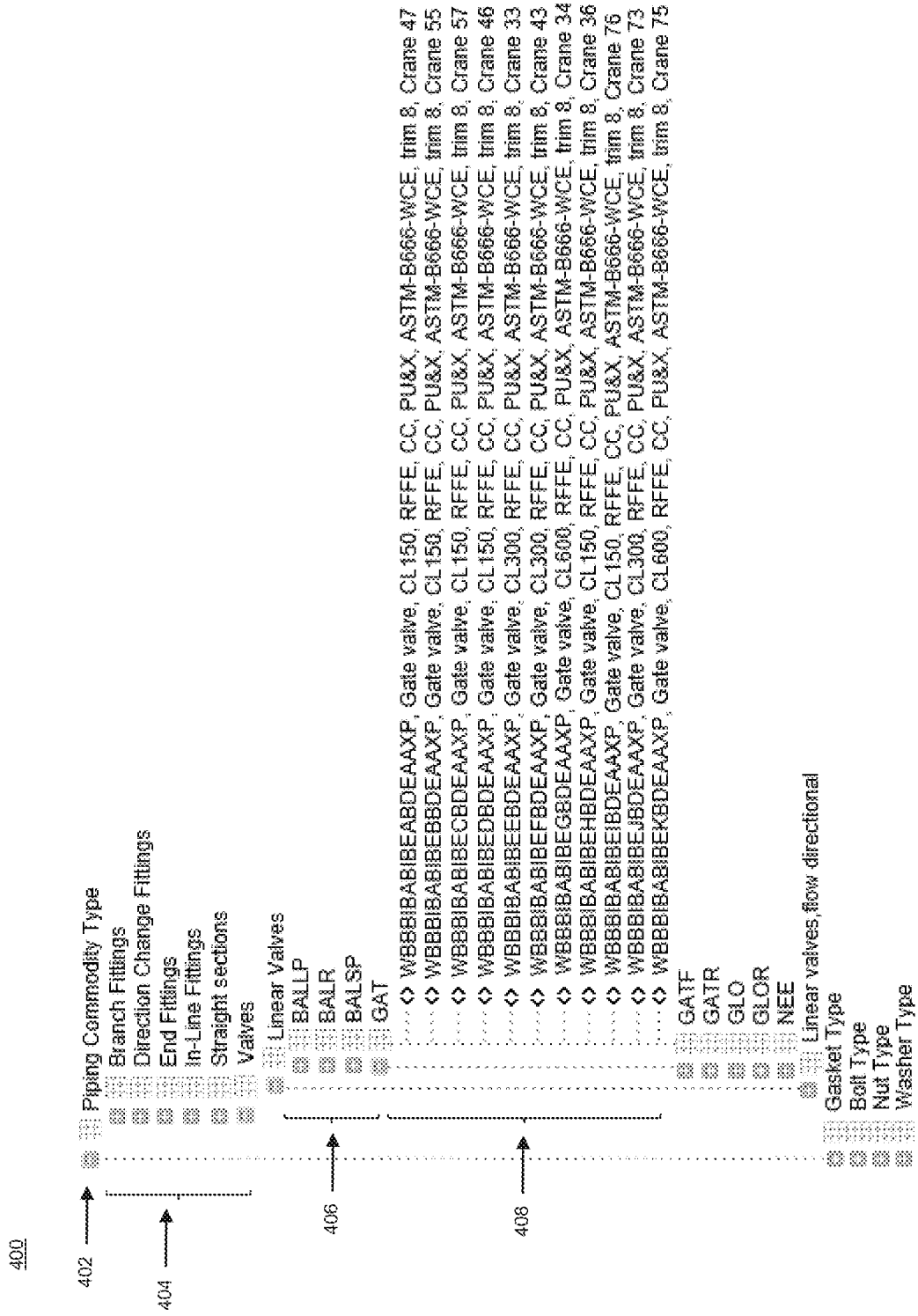
FIG. 4 illustrates an example layout of a piping component hierarchy.

FIG. 4 illustrates an example layout 400 of a piping component hierarchy 402. In a tree-like fashion, the layout 400 can be classified into several sub-classifications 404 based on the design standards and practices. Examples for sub-classifications 404 are: Valves, In-Line Fittings, End Fittings, Direction Change Fittings, Branch Fittings, Straight sections, etc. where valves can be further divided into Linear Valves and Linear Valves (flow directional). Focusing on Linear Valves, those can further have the sub-grouping 406 for Ball Valve with Long Pattern (BALLP), Ball Valve with Reduced Port (BALR), Ball valve with Short Pattern (BALSP), Gate Valve (GAT), etc. Eventually on the leaf of this hierarchy, we can find the individual commodities 408, for example, "Gate valve, CL300, RFFE, BB, OS&Y, ASTM-A216-WCB, trim 8, Crane 33", "Gate valve, CL600, RFFE, BB, OS&Y, ASTM-A105, trim 8, Smith 860", etc.

Figure 5:
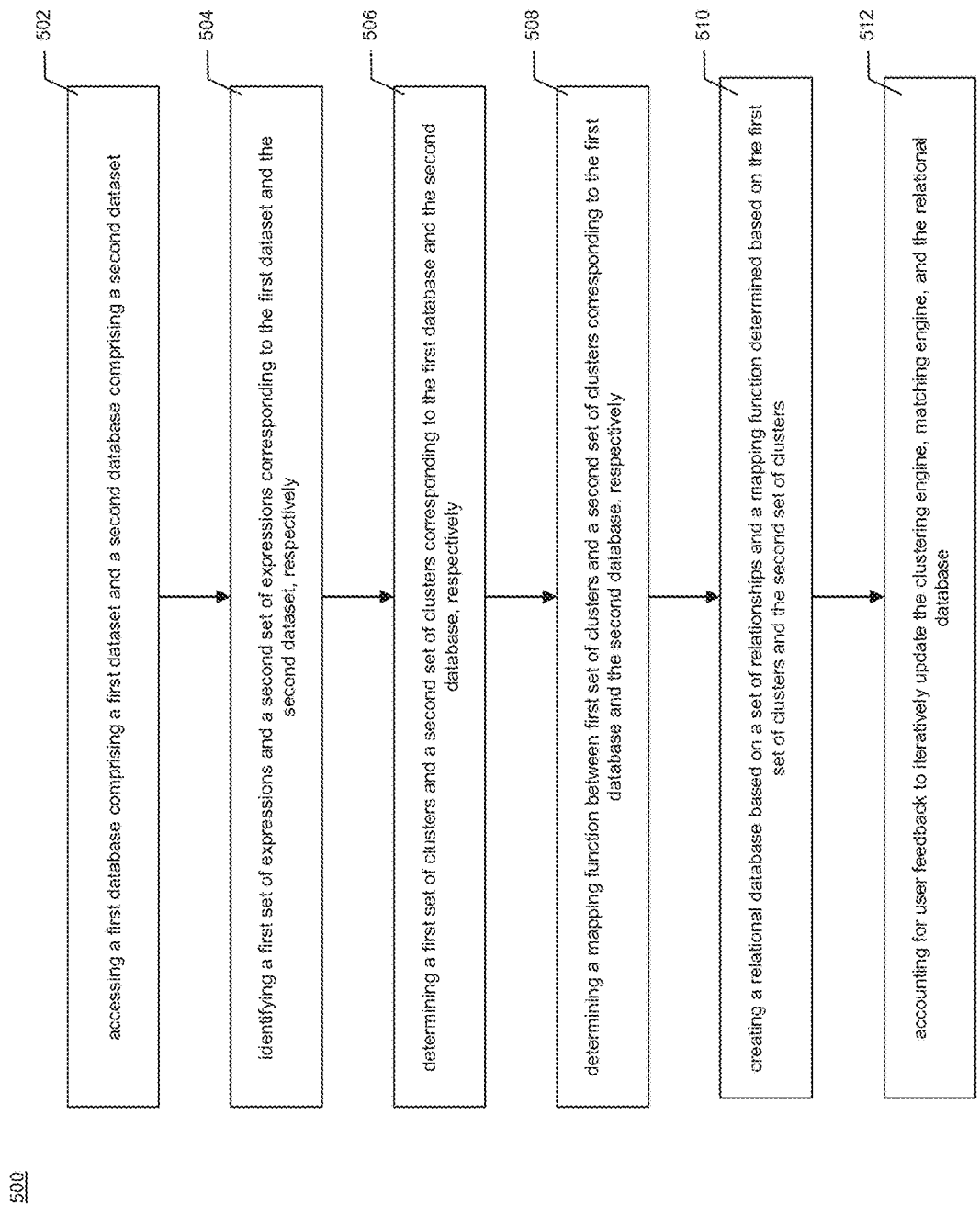
FIG. 5 illustrates a method of associating data from a plurality of databases, according to one or more embodiments of the present subject matter.

FIG. 5 illustrates a method 500 of associating data from a plurality of databases, according to one or more embodiments of the present subject matter. The method 500 may be implemented using one or more components of the system 102. For the sake of brevity, details of the present disclosure that have been explained in detail with reference to description of FIG. 1 and FIG. 2 above are not explained in detail herein.

At step 502, a first database comprising a first dataset and a second database comprising a second dataset is accessed. In an example, the first dataset includes object descriptions associated with a plurality of objects as per a first schema. Furthermore, the second dataset includes object descriptions associated with the plurality of objects as per a second schema. In an example embodiment, the identification engine 204 may be configured to access the first database 104-1 and the second database 104-2.

At step 504, a first set of expressions and a second set of expressions corresponding to the first dataset and the second dataset, respectively, are identified. Herein, each expression of the first set of expressions and the second set of expressions comprises of at least one entry encoded using alphanumerical characters. Furthermore, the expression defines an attribute of an object from the plurality of objects. In an example embodiment, the identification engine 204 may be configured to identify first set of expressions and the second set of expressions.

At step 506, a first set of clusters and a second set of clusters corresponding to the first database and the second database, respectively, are determined. In an example, each cluster in the first set of clusters comprises a corresponding first set of contextually similar objects from the plurality of objects. In an example, each cluster in the second set of clusters comprises a corresponding second set of contextually similar objects from the plurality of objects. In an example, the set of clusters may be determined based on at least one of domain data associated with the plurality of objects, an object category associated with the plurality of objects, a set of domain rules, the first set of expressions, and the second set of expressions. In an example, the clustering engine 206 may be configured to determine the first set of clusters and the second set of clusters.

In an example embodiment, in the method 500, the determining of the first set of clusters and second set of clusters comprises of performing at least one of a rule-based technique and an Artificial Intelligence (AI) based technique, as explained above in FIG. 2.

Furthermore, the determining of the set of clusters include identifying the corresponding first set of contextually similar objects and the corresponding second set of contextually similar objects based on one of the domain data and contextual similarity. Herein, the contextual similarity is based at least on the domain data, the first set of expressions, and the second set of expressions.

At step 508, the method 500 comprises determining a mapping function between first set of clusters and a second set of clusters corresponding to the first database and second database respectively. This is carried out by the matching engine 208.

At step 510, the method 500 comprises creating a relational database based on a set of relationships and a mapping function determined based on the first set of clusters and the second set of clusters. In an example, the relational database comprises a mapping between at least one of the first set of clusters and the second set of clusters, the first set of expressions and the second set of expressions, the first set of contextually similar objects and the second set of contextually similar objects, and the first schema and the second schema. In an example, in the method 500, the mapping in the relational database is stored as a knowledge graph defining the set of relationships at various levels, as explained above. In an example, the database manager 210 may be configured to create the relational database.

At step 512, the method 500 further comprises of updating the knowledge graph. Herein, in an example, the update comprises providing the knowledge graph to a user. Furthermore, the method 500 comprises receiving a user input for updating at least one relationship from the set of relationships. Furthermore, the method 500 comprises updating the at least one relationship to generate an updated knowledge graph. Furthermore, the method 500 comprises storing the updated knowledge graph in a central storage accessible to a plurality of authenticated computing terminals. In an example, the database manager 210 may be configured to update the knowledge graph.

In another example embodiment, the updating of the knowledge graph, as per the step 512 in the method 500, includes obtaining an update to at least one of the domain data and at least one relationship in the set of relationships. Accordingly, the step 512 of the method 500 includes updating the knowledge graph based on the obtained update. Furthermore, the step 512 of the method 500 includes storing the updated knowledge graph in a central storage accessible to a plurality of authenticated computing terminals. In an example, the database manager 210 may be configured to update the knowledge graph.

In an example embodiment, the method 500 further includes handling queries based on the created relational database. In an example, the query handler 212 may handle the query, as described above in the description of FIG. 2.

FIG. 6(a)-6(d) illustrates an example use case, according to an aspect of the present subject matter. In said example use case, the ADM system 102 may access example databases 600-1 and 600-2, shown in FIG. 6(a). In an example, the each of the databases 600 includes a dataset 602. Furthermore, each of the dataset 602 includes object descriptions 604 comprising expressions 606-1 and 606-2, respectively. According to aspects of the present subject matter a relational database may be created based on the databases 600.

Figure 6A:
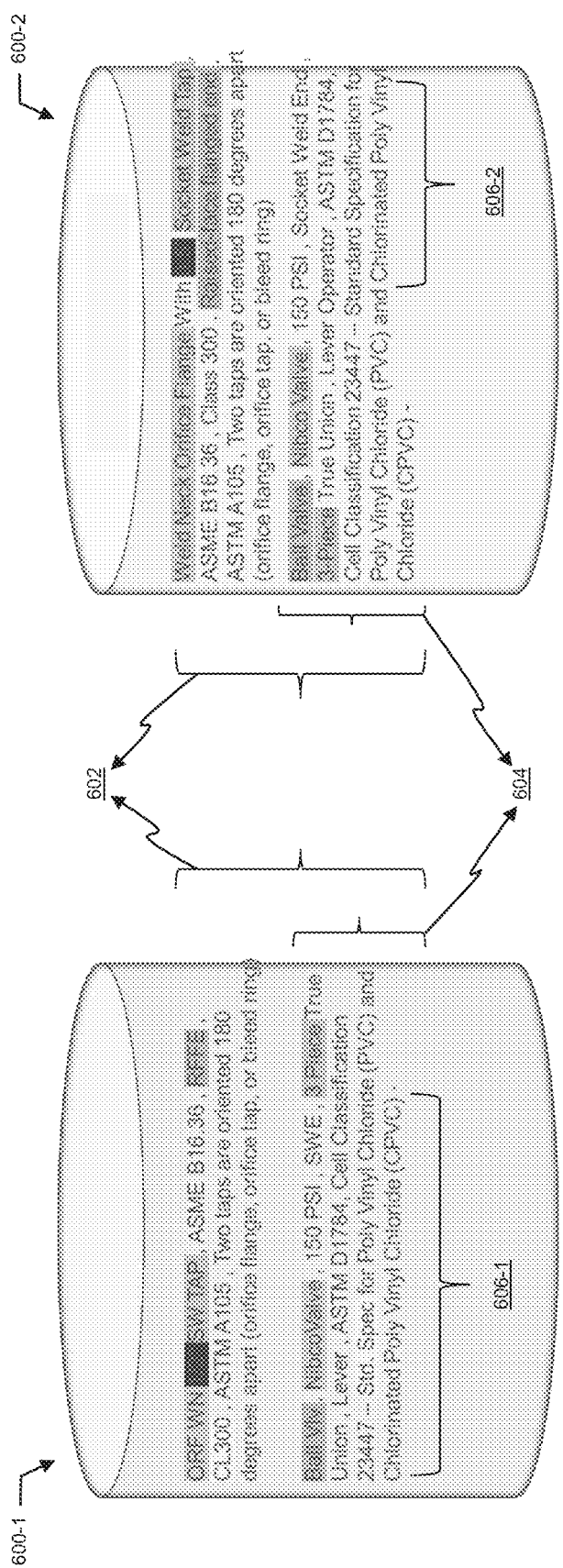
FIGS. 6(a)-(d) illustrate an example use case, according to an aspect of the present subject matter.
Figure 6B:
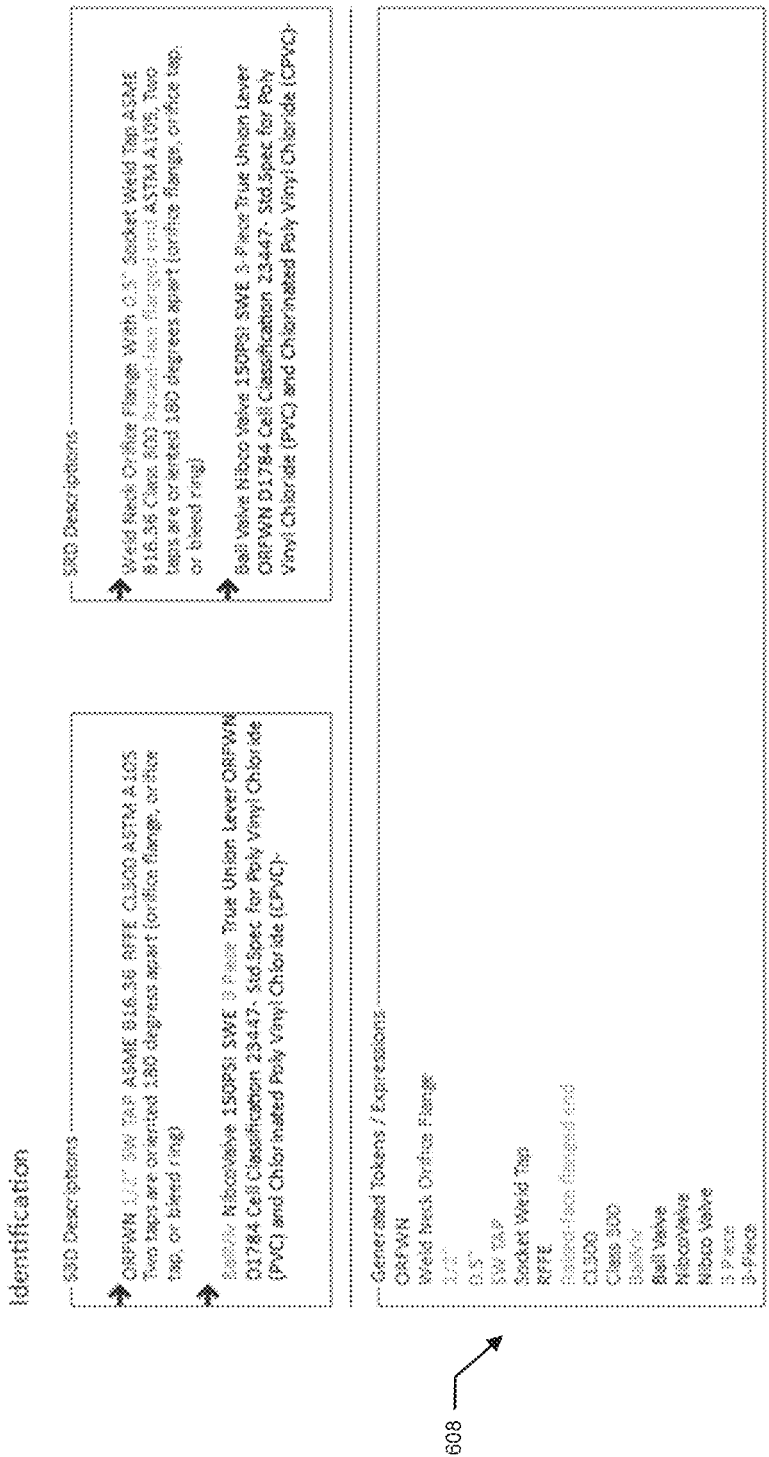
Figure 6C:
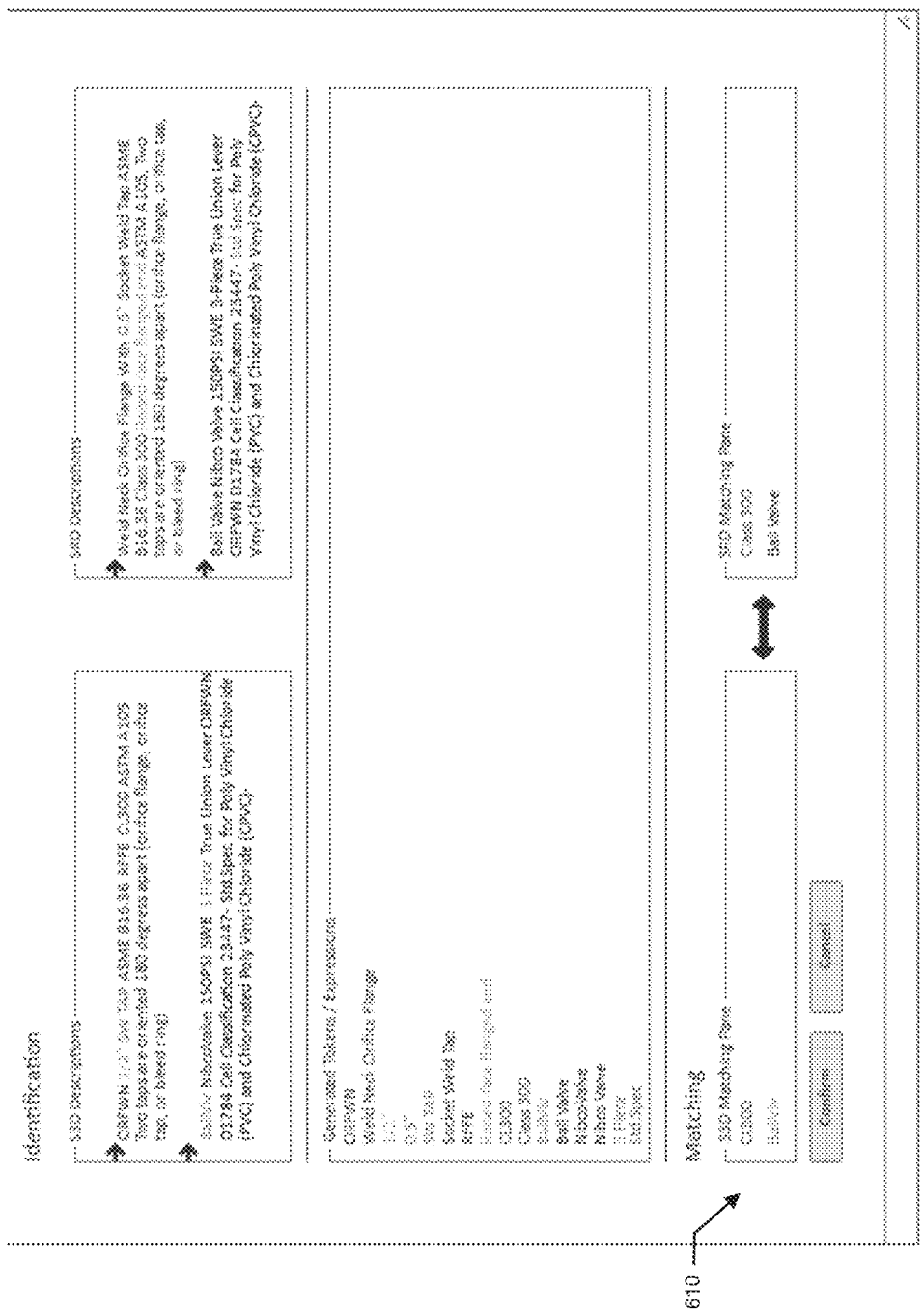

Upon accessing the databases 600, the ADM system 102 may be configured to identify a list of expressions 608, as shown in the FIG. 6(b). The list of expressions may include a first set of expressions and a second set of expressions, corresponding to the databases 600-1 and 600-2, respectively. Referring to FIG. 6(c), a step of matching is shown, where the ADM system 102 matches the expressions present in the first database 600-1 with the expressions of the second database 600-2.

Figure 6D:
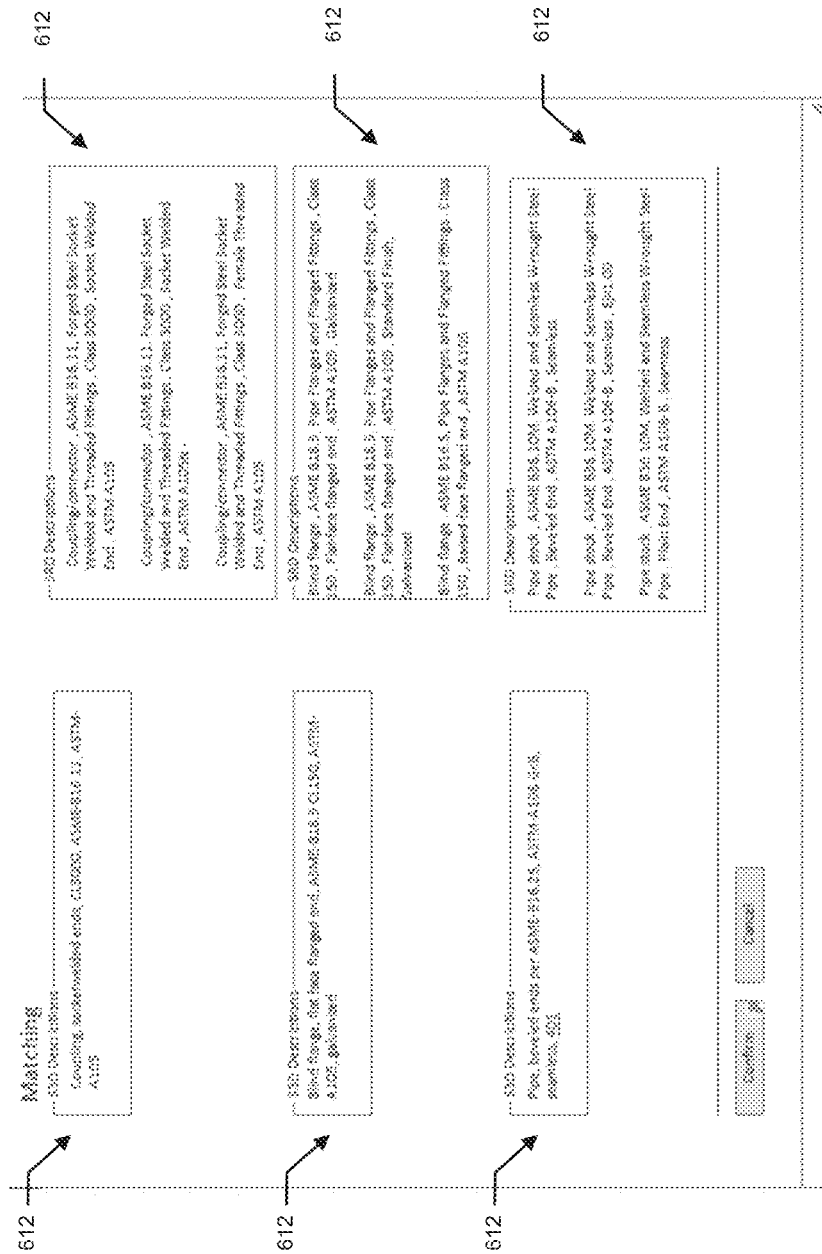

Writing further, in FIG. 6(d), the ADM system 102 further provides a list of matching codelist descriptions that match a description from a first database (104-1) transmitted through the query handler (212) to corresponding descriptions from a second database (104-2) using the relational database (206). The ADM system 102 clusters the objects into different clusters 612, such that the contextually similar objects are present in a single cluster. Subsequently, the ADM system 102 may be configured to create a relational database based on the set of clusters 612.

In an example embodiment, the ADM 102 may receive a user input at any of the above stages to train the components of the ADM system 102. For instance, based on a user feedback or input received at any stage, one or more of the identification engine 204, the clustering engine 206, the matching engine 208, the database manager 210, and the query handler 212 may be updated and/or trained.

In FIG. 7, a two-dimensional plot 700 illustrates a step of clustering. As explained above, the ADM system 102 clusters the objects into different clusters 612, such that the contextually similar objects are present in a single cluster. Subsequently, the ADM system 102 may be configured to create a relational database based on the set of clusters 612. Each point in this two-dimensional plot 700 represents the mapping of a codelist description into an embedding space. The clustering engine 206 maps points closer together in the displayed embedding space if they are contextually more similar and further away from each other if they are contextually less similar. By black circles, some example clusters 702, such as the clusters 612, are highlighted. Furthermore, example values of some of the codelist descriptions that appear in a single cluster 702 are also shown. An engineer skilled in the art will easily recognize the contextual similarity between these codelist descriptions pointed out in the accompanying table of short descriptions.

FIG. 8 illustrates an example vector space of an exemplary use case, where an unsupervised language model groups contextually similar word tokens together into expressions. In an example, the identification engine 204 implements the unsupervised language model to derive statistical co-occurrences and groups contextually similar word tokens together into expressions. For instance, the expressions "Butterfly Valve" and "Globe Valve" describe different commodity types for the same object "Valve".

Therefore, in this example, the language model learnt to group word tokens "Butterfly" and "Globe" always with the word token "Valve".

While specific language has been used to describe the present disclosure, any limitations arising on account thereto, are not intended. As would be apparent to a person in the art, various working modifications may be made to the method in order to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

We claim:

1. A method of associating data from a plurality of databases, the method comprising:
   accessing a first database and a second database, wherein the first database comprises a first dataset of object descriptions associated with a plurality of objects as per a first schema, and wherein the second database comprises a second dataset of object descriptions associated with the plurality of objects as per a second schema, wherein each object of the plurality of objects is a digital representation of a corresponding physical world item, the items comprising assets at industrial or construction facilities, the assets including specific pipes, specific valves and specific gaskets;
   identifying a first set of expressions and a second set of expressions corresponding to the first dataset and the second dataset, respectively, wherein each expression of the first set of expressions and the second set of expressions comprises of at least one entry encoded using alphanumerical characters and defines an attribute of an object from the plurality of objects;
   determining a first set of clusters and a second set of clusters corresponding to the first database and the second database, respectively, based on at least one of domain data associated with the plurality of objects, an object category associated with the plurality of objects, a set of domain rules, the first set of expressions, and the second set of expressions, wherein each cluster in the first set of clusters comprises a corresponding first set of contextually similar objects from the plurality of objects and each cluster in the second set of clusters comprises a corresponding second set of contextually similar objects from the plurality of objects, the object category comprising a hierarchical categorization of pipes, valves and gaskets; and
   creating a relational database based on a set of relationships and a mapping function determined based on the first set of clusters and the second set of clusters, wherein the relational database comprises a mapping between at least one of the first set of clusters and the second set of clusters, the first set of expressions and the second set of expressions, the first set of contextually similar objects and the second set of contextually similar objects, and the first schema and the second schema,
   wherein the determining of the first set of clusters and second set of clusters comprises
   performing an Artificial Intelligence (AI) based technique comprising:
      analysing the first set of expressions and the second set of expressions; and
      determining the first set of clusters and the second set of clusters based on a semantic and contextual similarity between the expressions in the first set of expressions and the second set of expressions, respectively.

2. The method of claim 1, further comprising:
   receiving a query comprising at least one of an object from the plurality of objects and at least a part of an object description associated with the object;
   identifying at least one of a cluster, an object, and an expression from the first set of clusters, the first set of contextually similar objects, and the first set of expressions, respectively, based on the query;
   identifying at least one of a cluster, an object, and an expression from the second set of clusters, the second set of contextually similar objects, and the second set of expressions, respectively, based on the mapping defined in the relational database; and
   providing at least one of the identified clusters, objects, and expressions as an output to the query.

3. The method of claim 1, further comprising determining an expression in the second set of expressions that matches an expression of the first set of expressions based on at least one or more of a statistical analysis of co-occurrences technique, a supervised machine learning technique, an unsupervised machine learning technique, and a reinforcement learning technique, wherein the supervised machine learning technique comprises one or more of deep neural networks, Siamese-like networks, and neural collaborative filtering, and wherein the unsupervised machine learning technique comprises one or more of recurrent autoencoders, word embeddings, and topic modelling.

4. The method of claim 1, wherein the determining of the first set of clusters and second set of clusters also comprises performing a rule-based technique comprising:
   analysing the first schema and the second schema; and
   extracting the set of domain rules based on the analysing, wherein the set of domain rules correspond to an order of object attributes for one or more object categories; and
   determining the first set of clusters and the second set of clusters based on the extracted set of domain rules.

5. The method of claim 1, further comprising identifying the corresponding first set of contextually similar objects and the corresponding second set of contextually similar objects based on one of the domain data and contextual similarity, wherein the contextual similarity is based at least on the domain data, the first set of expressions, and the second set of expressions.

6. The method of claim 1, wherein the mapping in the relational database is stored as a knowledge graph defining the set of relationships between at least one of the first set of clusters and the second set of clusters, the first set of expressions and the second set of expressions, the first set of contextually similar objects and the second set of contextually similar objects and the first schema and the second schema, wherein the method further comprises:
   providing the knowledge graph to a user;
   receiving a user input for updating at least one relationship from the set of relationships;
   updating the at least one relationship to generate an updated knowledge graph; and
   storing the updated knowledge graph in a central storage accessible to a plurality of authenticated computing terminals.

7. The method of claim 1, wherein the mapping in the relational database is stored as a knowledge graph defining the set of relationships between at least one of the first set of clusters and the second set of clusters, the first set of expressions and the second set of expressions, the first set of contextually similar objects and the second set of contextually similar objects and the first schema and the second schema, wherein the method further comprises:
obtaining an update to at least one of the domain data and at least one relationship in the set of relationships;
updating the knowledge graph based on the obtained update; and
storing the updated knowledge graph in a central storage accessible to a plurality of authenticated computing terminals.

8. An adaptive database matching (ADM) system for associating data from a plurality of databases, the ADM system comprising:
a processor;
an identification engine coupled to the processor and configured to:
access a first database and a second database, wherein the first database comprises a first dataset of object descriptions associated with a plurality of objects as per a first schema, and wherein the second database comprises a second dataset of object descriptions associated with the plurality of objects as per a second schema, wherein each object of the plurality of objects is a digital representation of a corresponding physical world item, the items comprising assets at industrial or construction facilities, the assets including specific pipes, specific valves and specific gaskets; and
identify a first set of expressions and a second set of expressions corresponding to the first dataset and the second dataset, respectively, wherein each expression of the first set of expressions and the second set of expressions comprises of at least one entry encoded using alphanumerical characters and defines an attribute of an object from the plurality of objects;
a clustering engine coupled to the processor and configured to determine a first set of clusters and a second set of clusters corresponding to the first database and the second database, respectively, based on at least one of domain data associated with the plurality of objects, an object category associated with the plurality of objects, a set of domain rules, the first set of expressions, and the second set of expressions, wherein each cluster in the first set of clusters comprises a corresponding first set of contextually similar objects from the plurality of objects and each cluster in the second set of clusters comprises a corresponding second set of contextually similar objects from the plurality of objects, the object category comprising a hierarchical categorization of pipes, valves and gaskets; and
a database manager coupled to the processor and configured to create a relational database based on a set of relationships and a mapping function determined based on the first set of clusters and the second set of clusters, wherein the relational database comprises a mapping between at least one of the first set of clusters and the second set of clusters, the first set of expressions and the second set of expressions, the first set of contextually similar objects and the second set of contextually similar objects, and the first schema and the second schema,
wherein, for determining of the first set of clusters and second set of clusters, the clustering engine is further configured to perform an Artificial Intelligence (AI) based technique comprising:
analysing the first set of expressions and the second set of expressions; and
determining the first set of clusters and the second set of clusters based on a semantic and contextual similarity between the expressions in the first set of expressions and the second set of expressions, respectively.

9. The ADM system of claim 8, further comprising a query handler coupled to the processor and configured to:
receive a query comprising at least one of an object from the plurality of objects and at least a part of an object description associated with the object;
identify at least one of a cluster, an object, and an expression from the first set of clusters, the first set of contextually similar objects, and the first set of expressions, respectively, based on the query;
identify at least one of a cluster, an object, and an expression from the second set of clusters, the second set of contextually similar objects, and the second set of expressions, respectively, based on the mapping defined in the relational database; and
provide at least one of the identified clusters, objects, and expressions as an output to the query.

10. The ADM system of claim 8, wherein the database manager is further configured to determine an expression in the second set of expressions that matches an expression of the first set of expressions based on at least one or more of a statistical analysis of co-occurrences technique, a supervised machine learning technique, an unsupervised machine learning technique, and a reinforcement learning technique, wherein the supervised machine learning technique comprises one or more of deep neural networks, Siamese-like networks, and neural collaborative filtering, and wherein the unsupervised machine learning technique comprises one or more of recurrent autoencoders, word embeddings, and topic modelling.

11. The ADM system of claim 8, wherein, for determining of the first set of clusters and second set of clusters, the clustering engine is further configured to perform a rule based technique comprising:
analysing the first schema and the second schema; and
extracting the set of domain rules based on the analysing, wherein the set of domain rules correspond to an order of object attributes for one or more object categories; and
determining the first set of clusters and the second set of clusters based on the extracted set of domain rules.

12. The ADM system of claim 8, wherein the clustering engine is further configured to identify the corresponding first set of contextually similar objects and the corresponding second set of contextually similar objects based on one of the domain data and contextual similarity, wherein the contextual similarity is based at least on domain data, the first set of expressions, and the second set of expressions.

13. The ADM system of claim 8, wherein the database manager is configured to store the mapping in the relational database as a knowledge graph defining the set of relationships between at least one of the first set of clusters and the second set of clusters, the first set of expressions and the second set of expressions, the first set of contextually similar objects and the second set of contextually similar objects and the first schema and the second schema, wherein the database manager is further configured to:
provide the knowledge graph to a user;

receive a user input for updating at least one relationship from the set of relationships;
update the at least one relationship to generate an updated knowledge graph; and
store the updated knowledge graph in a central storage accessible to a plurality of authenticated computing terminals.

14. The ADM system of claim 8, wherein the database manager is configured to store the mapping in the relational database as a knowledge graph defining the set of relationships between at least one of the first set of clusters and the second set of clusters, the first set of expressions and the second set of expressions, the first set of contextually similar objects and the second set of contextually similar objects and the first schema and the second schema, wherein the database manager is further configured to:
obtain an update to at least one of the domain data and at least one relationship in the set of relationships;
update the knowledge graph based on the obtained update; and
store the updated knowledge graph in a central storage accessible to a plurality of authenticated computing terminals.

15. A non-transitory medium comprising computer-executable instructions which, when executed by a processor, cause the processor to:
access a first database and a second database, wherein the first database comprises a first dataset of object descriptions associated with a plurality of objects as per a first schema, and wherein the second database comprises a second dataset of object descriptions associated with the plurality of objects as per a second schema, wherein each object of the plurality of objects is a digital representation of a corresponding physical world item, the items comprising assets at industrial or construction facilities, the assets including specific pipes, specific valves and specific gaskets;
identify a first set of expressions and a second set of expressions corresponding to the first dataset and the second dataset, respectively, wherein each expression of the first set of expressions and the second set of expressions comprises of at least one entry encoded using alphanumerical characters and defines an attribute of an object from the plurality of objects;
determine a first set of clusters and a second set of clusters corresponding to the first database and the second database, respectively, based on at least one of domain data associated with the plurality of objects, an object category associated with the plurality of objects, a set of domain rules, the first set of expressions, and the second set of expressions, wherein each cluster in the first set of clusters comprises a corresponding first set of contextually similar objects from the plurality of objects and each cluster in the second set of clusters comprises a corresponding second set of contextually similar objects from the plurality of objects, the object category comprising a hierarchical categorization of pipes, valves and gaskets; and
create a relational database based on a set of relationships and a mapping function determined based on the first set of clusters and the second set of clusters, wherein the relational database comprises a mapping between at least one of the first set of clusters and the second set of clusters, the first set of expressions and the second set of expressions, the first set of contextually similar objects and the second set of contextually similar objects, and the first schema and the second schema,
wherein said computer-executable instructions, when executed by the processor for determining of the first set of clusters and second set of clusters, further cause the processor to perform an Artificial Intelligence (AI) based technique comprising:
analysing the first set of expressions and the second set of expressions; and
determining the first set of clusters and the second set of clusters based on a semantic and contextual similarity between the expressions in the first set of expressions and the second set of expressions, respectively.

16. The non-transitory medium of claim 15, wherein said computer-executable instructions, when executed by the processor, further cause the processor to:
receive a query comprising at least one of an object from the plurality of objects and at least a part of an object description associated with the object;
identify at least one of a cluster, an object, and an expression from the first set of clusters, the first set of contextually similar objects, and the first set of expressions, respectively, based on the query;
identify at least one of a cluster, an object, and an expression from the second set of clusters, the second set of contextually similar objects, and the second set of expressions, respectively, based on the mapping defined in the relational database; and
provide at least one of the identified clusters, objects, and expressions as an output to the query.

17. The non-transitory medium of claim 15, wherein said computer-executable instructions, when executed by the processor, further cause the processor to determine an expression in the second set of expressions that matches an expression of the first set of expressions based on at least one or more of a statistical analysis of co-occurrences technique, a supervised machine learning technique, an unsupervised machine learning technique, and a reinforcement learning technique, wherein the supervised machine learning technique comprises one or more of deep neural networks, Siamese-like networks, and neural collaborative filtering, and wherein the unsupervised machine learning technique comprises one or more of recurrent autoencoders, word embeddings, and topic modelling.

18. The non-transitory medium of claim 15, wherein said computer-executable instructions, when executed by the processor for determining of the first set of clusters and second set of clusters, further cause the processor to perform a rule based technique comprising:
analysing the first schema and the second schema; and
extracting the set of domain rules based on the analysing, wherein the set of domain rules correspond to an order of object attributes for one or more object categories; and
determining the first set of clusters and the second set of clusters based on the extracted set of domain rules.

19. The non-transitory medium of claim 15, wherein said computer-executable instructions, when executed by the processor, further cause the processor to identify the corresponding first set of contextually similar objects and the corresponding second set of contextually similar objects based on one of the domain data and contextual similarity, wherein the contextual similarity is based at least on domain data, the first set of expressions, and the second set of expressions.

20. The non-transitory medium of claim 15, wherein the mapping is stored in the relational database as a knowledge graph defining the set of relationships between at least one of the first set of clusters and the second set of clusters, the first set of expressions and the second set of expressions, the first set of contextually similar objects and the second set of contextually similar objects and the first schema and the second schema, wherein said computer-executable instructions, when executed by the processor, further cause the processor to:

provide the knowledge graph to a user;
receive a user input for updating at least one relationship from the set of relationships;
update the at least one relationship to generate an updated knowledge graph; and
store the updated knowledge graph in a central storage accessible to a plurality of authenticated computing terminals.

21. The non-transitory medium of claim 15, wherein the mapping is stored in the relational database as a knowledge graph defining the set of relationships between at least one of the first set of clusters and the second set of clusters, the first set of expressions and the second set of expressions, the first set of contextually similar objects and the second set of contextually similar objects and the first schema and the second schema, wherein said computer-executable instructions, when executed by the processor, further cause the processor to:

obtain an update to at least one of the domain data and at least one relationship in the set of relationships;
update the knowledge graph based on the obtained update; and
store the updated knowledge graph in a central storage accessible to a plurality of authenticated computing terminals.

* * * * *